Sept. 15, 1964 D. S. TRUOG ETAL 3,148,676
UNIT FOR MAINTAINING FOOD AT A CONSTANT TEMPERATURE
Filed Dec. 10, 1962

INVENTORS.
Daniel S. Truog
BY Kermit W. Dyer

ATTORNEYS.

United States Patent Office 3,148,676
Patented Sept. 15, 1964

3,148,676
UNIT FOR MAINTAINING FOOD AT A CONSTANT TEMPERATURE
Daniel S. Truog, Kansas City, Mo., and Kermit W. Dyer, Roeland Park, Kans., assignors to Crimsco, Inc., Kansas City, Mo., a corporation of Missouri
Filed Dec. 10, 1962, Ser. No. 243,379
5 Claims. (Cl. 126—246)

This invention relates to heat-transfer means and, more particularly, to structure for maintaining food in a heated or cooled condition as the food is moved from place to place.

The problem to which the present invention relates is that of maintaining plates of prepared food warm during periods of transit of the food from a preparation region to a region at which the food is consumed, such as from the kitchen to the room of a patient in a hospital.

Heretofore, it has been the usual practice to maintain plates of food in a heated condition by utilizing preheated, solid blocks or discs of metal, usually aluminum, which radiated and conducted heat stored therein to the plates and thereby the food on the latter. The food was thus maintained in a heated state for a substantial period of time as the plates were moved from one place to another. Such discs or blocks have been normally received within metal bases for supporting the plate thereon, such base serving, in conjunction with a cover lid, to confine and concentrate the heat radiated from the block or disc onto the plate and the food carried thereby.

Such blocks or discs must of necessity be heated to a temperature of approximately 450° F. to store enough heat therein to keep the food hot for any appreciable period. The handling of such blocks or discs is, therefore, somewhat hazardous in view of the relatively high temperatures required thereof. In addition, the practical limitation upon the amount of heat that can be stored in a piece of metal of given size without exceeding reasonable temperatures, restricts the period for which such solid metal pieces can keep the food warm.

The present invention is directed to structure for maintaining plates, and thereby food carried thereon, in a heated condition, and to this end, includes means for containing a preheated substance of high specific heat and low melting point and capable of changing physical state from a solid to a liquid at a given temperature. The structure is configured for transferring heat from the substance to a plate carried thereon to thereby maintain food on the plate in a warm condition. Since a relatively large quantity of heat is given off by the substance per unit of weight thereof at the time it changes physical state, the successive change of small increments of the same over an extended period causes relatively uniform release of sufficient heat from the structure to keep food on the plate in a warm condition. Moreover, means is provided for presenting a relatively large number of heat-transfer surfaces in thermal interchange relationship with the substance so that the thermal energy is more effectively and efficiently transferred into the substance, as well as permitted to radiate therefrom during use of the structure to warm food or the like. In view of the aforesaid characteristics of the substance, prepared food may be maintained in a heated condition at lesser initial elevated temperatures than was heretofore required.

It is, therefore, the primary object of the present invention to provide improved structure for maintaining prepared food in a heated condition wherein such means includes a substance having a relatively high specific heat and a relatively low melting point whereby the temperature at which the structure is to be heated for food warming purposes is substantially less than that required for heating food warming means heretofore utilized to the end that the structure of the present invention is much safer to handle.

Another object of the present invention is the provision of a receptacle for the transferring the heat from the substance to the food to be warmed and means within the receptacle providing a large number of heat transfer surfaces in contact with the substance, whereby the heat from the substance is more readily conducted to the receptacle and thereby the food to be warmed, notwithstanding the relatively high retentivity of the substance itself.

Yet another object of the present invention is the provision of framework of a substantially honeycomb configuration within the receptacle in engagement with the latter and the substance contained thereby whereby the framework presents a multiplicity of relatively small substance-receiving cavities, as well as providing a plurality of heat-tranfer surfaces thermally interconnecting the substance and the receptacle to thereby increase the heat conductivity therebetween.

Other objects of this invention will become apparent as the following specification progresses, reference being had to the accompanying drawing, wherein.

Figure 1:
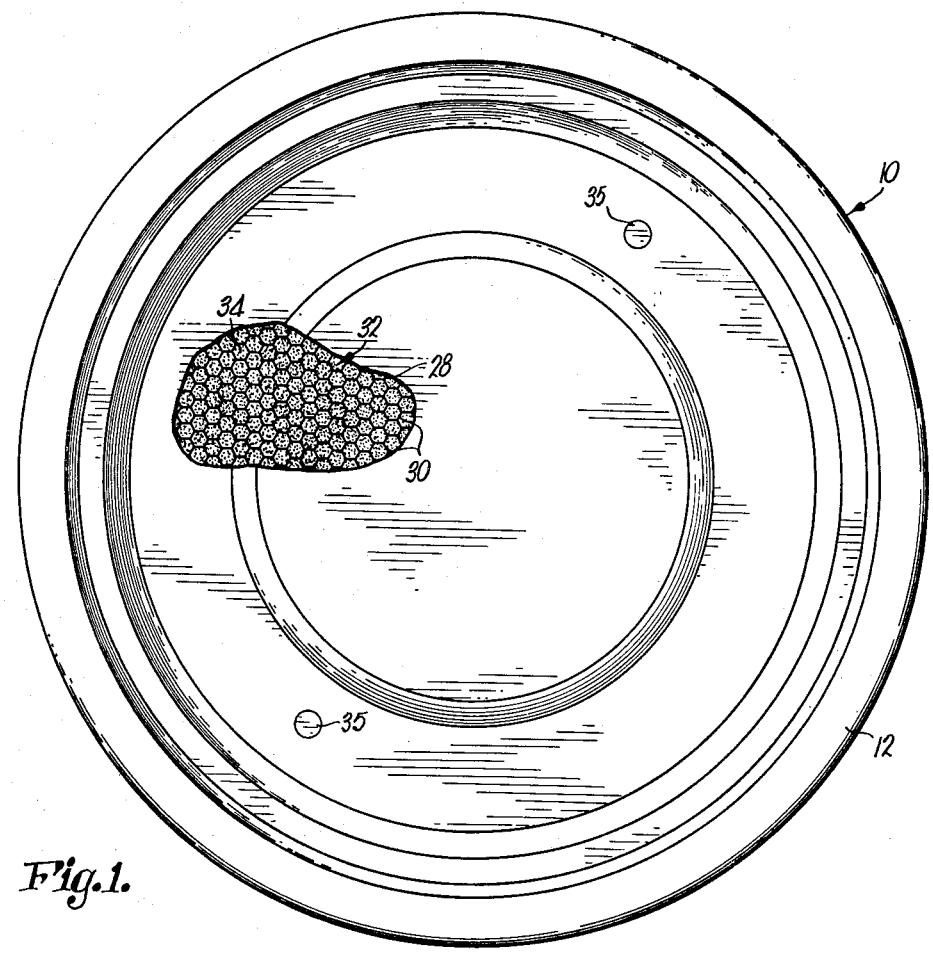
FIGURE 1 is a plan view of the unit for maintaining food in a heated condition illustrating a receptacle for supporting plates of prepared food and adapted for containing a quantity of a low melting point substance having a high specific heat, parts being broken away to illustrate the honeycomb configuration within the receptacle for presenting a plurality of heat transfer surfaces therefor.

The present invention provides food warming means and includes a receptacle having a pair of spaced bottom walls upon which a plate of food to be warmed is supported. A meltable substance having a relatively high specific heat and a relatively low melting point is contained within the receptacle and the latter, together with the substance, is adapted to be heated to a predetermined elevated temperature sufficient to melt the substance in the receptacle.

An open framework in the nature of a honeycomb configuration is disposed within the receptacle in contact with the bottom walls thereof and presenting a number of substance-receiving cavities and a plurality of heat-transfer surfaces for thermally interconnecting the substance with the bottom walls of the receptacle. Heat is thus effectively conducted to the walls through the framework to thereby maintain the plate of prepared food supported on the receptacle in a heated condition.

The unit forming the subject of the present invention is broadly denoted by the numeral 10 and includes a receptacle 12 having a pair of vertically spaced, normally horizontally disposed walls 14 and 16 presenting a chamber 18 therebetween. Walls 14 and 16 are formed from a metallic material having a relatively high thermal conductivity such as stainless steel, aluminum or the like, and are provided with peripheral edges 20 and 22 respectively, which are interconnected in any suitable manner for enclosing chamber 18. Wall 14 is configured in a manner to present an annular recess 24 therein, and wall 16 is configured to present a number of frusto-conical feet 26 each having its apex end spaced outwardly from wall 16 and in underlying relationship to recess 24. Recess 24 of each receptacle 12 is sufficiently wide enough to receive feet 26 so that a number of receptacles 12 may be disposed in vertically stacked relationship in the manner shown in FIG. 3.

Figure 2:
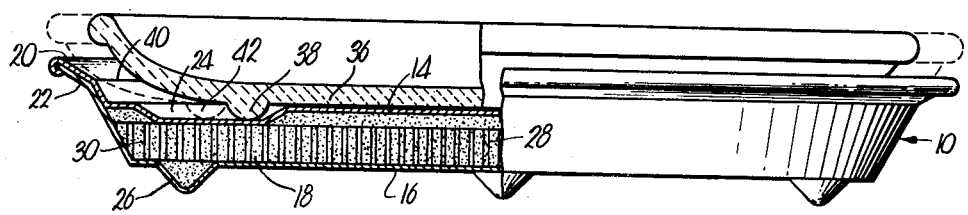
FIG. 2 is a side view of the unit illustrated in FIG. 1 and showing the use thereof with a plate on which food to be warmed is disposed, parts being broken away and in section to reveal details of the framework within the receptacle.
Figure 3:
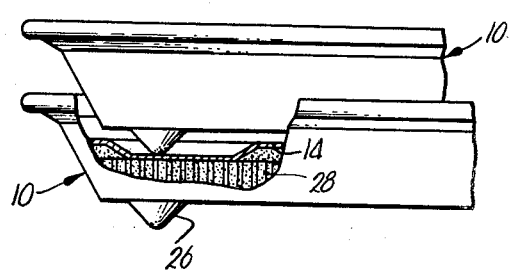
FIG. 3 is a fragmentary view of a pair of units disposed in stacked relationship for storage purposes.

Structure in the nature of an open framework 28 is disposed within receptacle 12 between walls 14 and 16 in the manner shown in FIGS. 2 and 3. Framework 28 has essentially a honeycomb configuration since the same is constructed of a plurality of strips 30 which are interconnected with each other at predetermined spaced locations thereon along the lengths thereof. Strips 30 are formed from a metallic material, preferably aluminum or the like, and the same substantially span the distance between and engage the innermost surfaces of wall 16 and that portion of wall 14 forming recess 24, as is clear in FIG. 2. Strips 30 are thus out of engagement with the central, major portion of wall 14.

Strips 30 form with each other a multiplicity of relatively small, closely spaced cavities or cells broadly denoted by the numeral 32 which are disposed for receiving a meltable substance having a relatively high specific heat and a relatively low melting point. Substance 34 substantially fills chamber 18 and is retained within cavities 32 preferably in the solid state at room temperatures.

Wall 14 is provided with a pair of spaced, circular lines of weakness 35 in the portion thereof defining recess 24. Lines 35 provide relief means to prevent the blowing up of unit 10 in the event that excessive fluid pressure is developed within chamber 18.

In use, unit 10 is heated so as to heat substance 34, initially in the solid state, to a predetermined elevated temperature, such as a temperature above the melting point of the substance 34. Unit 10 is then supported in any suitable manner, such as on a food cart or the like, and a plate 36 is disposed on wall 14 in the manner shown in FIG. 2. Plate 36 is shown as being provided with an annular rib 38 receivable within recess 24, but it is clear that plate 36 may be substantially flat on the bottom surface thereof and still be utilized with unit 10.

Heat is conducted to and through wall 14 by way of strips 30 and substance 34, the latter being in substantial contact with the inner surface of the central portion thereof. Heat is thus received by plate 36 so that food carried by the plate will be maintained in a heated condition. Such heat received by plate 36 is due to radiation, conduction and convection. The annular portion of wall 14 adjacent edge 20, although being out of engagement with the corresponding marginal edge of plate 36, provides means for directing convection currents of heat toward such marginal edge of plate 36 so that substantially the entire area of plate 36 is exposed to the heat issuing from substance 34 within cavities 32.

A cover is usually placed over unit 10 and plate 36 to prevent substantial heat loss to the surrounding atmosphere. Heat is thus confined in and around plate 36 and thereby the food carried thereby.

Since feet 26 effectively space wall 16 above the surface supporting unit 10, an air space is formed below wall 16 to insulate unit 10 from the surface and cause any heat tending to be radiated downwardly to be radiated laterally or upwardly. Thus, the efficiency of unit 10 is enhanced.

Substance 34 is preferably formed from wax or asphalt since these substances have relatively high specific heats and are easily contained within receptacle 12. It is to be noted that as substance 34 is heated so as to change the same from a solid to a liquid, a relatively large amount of heat energy is required, namely, the heat of fusion of the substance. This energy is stored in substance 34 and is gradually released therefrom at a rate much less than the rate at which it was stored. Substance 34 may well be heated to a temperature above its melting temperature, so that a sufficient amount of heat energy is available for keeping food warm for relatively long periods of time.

In this respect, the configuration of framework 28 is especially important in that the honeycomb structure thereof assists in conducting heat to substance 34 in the solid state and assists in conducting and radiating the heat to plate 36 after substance 34 has been heated and unit 10 is in use.

Provision is made of course, for accommodating a plate 40 of greater diameter than plate 36 and shown in dashed lines in FIG. 2. By virtue of the construction of recess 24, the annular rib 42 of plate 40 is easily positioned without altering the location of the central portion of plate 40 with respect to the major central portion of wall 14.

In selecting the type of substance 34 to be utilized with unit 10, a number of factors should be considered in addition to the specific heat parameter. Among such factors are latent heat of fusion, melting point, thermal expansion, thermal conductivity, and flash point. The melting point ranges found to be suitable for substance 34 is in the range between 180° and 270° F. The thermal expansion is preferably less than 25% by volume from 80° F. to 220° F. based on a volume at 80° F. The flash point should be greater than 450° F. as a precautionary measure. The latent heat of fusion, specific heat and thermal conductivity are preferably chosen subject to the ranges of the foregoing factors.

Tests have shown that waxes other than beeswax are suitable for use with unit 10. Among these are refined carnauba wax, Cornox wax and a synthetic hardened microcrystalline wax such as Bareco's Petrolite P 20. An asphaltic substance acceptable for use with unit 10 is 230 grade asphalt manufactured by Mobil Oil Company.

Unit 10, when enclosed within a relatively large cover or the like, may be utilized for heating dishes or plates of food laterally spaced from receptacle 12 by radiation.

Although unit 10 has been described as being circular, it is clear that the same may be of any shape without departing from the scope of the invention.

Having thus described the invention, what is claimed as new and desired to be secured by Letters Patent is:

1. A unit for maintaining food in a heated condition comprising:
  a receptacle having a pair of vertically spaced walls and means to present a closed chamber between the walls;
  a low melting point substance having a relatively high specific heat within said chamber; and
  open framework structure within said chamber in thermal interchange relationship with the walls and said substance, said structure being comprised of a plurality of interconnected, heat-conducting strips disposed to present a plurality of individual, substantially upright cavities surrounded by the corresponding strips, certain of the strips spanning the distance between and being in engagement with said walls to support the latter against collapsing, said substance substantially filling the cavities formed by said strips.

2. The invention of claim 1, said structure having a honeycomb configuration.

3. The invention of claim 1, the lower of said walls having a number of feet thereon extending outwardly therefrom in a direction away from the upper of said walls.

4. The invention of claim 1, the upper of said walls being substantially flat and provided with an annular recess therein for receiving the projecting portions on the bottom face of a food-supporting plate.

5. The invention of claim 1, said means presenting a chamber between said walls including a continuous side wall secured to said vertically spaced walls, said side wall flaring outwardly as the upper extremity thereof is approached.

References Cited in the file of this patent

UNITED STATES PATENTS

| | | |
|---|---|---|
| 1,412,717 | Stowell | Apr. 11, 1922 |
| 2,556,498 | Jackson | June 12, 1951 |
| 2,640,478 | Flournoy | June 2, 1953 |
| 2,876,634 | Zimmerman et al. | Mar. 10, 1959 |
| 2,915,397 | Telkes | Dec. 1, 1959 |
| 3,018,087 | Steele | Jan. 23, 1962 |
| 3,038,058 | Gordon | June 5, 1962 |

FOREIGN PATENTS

| | | |
|---|---|---|
| 28,042 | Great Britain | of 1896 |